(12) United States Patent
Williamson et al.

(10) Patent No.: US 9,381,706 B2
(45) Date of Patent: Jul. 5, 2016

(54) BUTTON MATRIX AND METHOD OF MOLDING THEREOF

(75) Inventors: Paul C. Williamson, Providence, RI (US); Jonathan Hayes, Boston, MA (US)

(73) Assignee: InMusic Brands, Inc., Cumberland, RI (US)

( * ) Notice: Subject to any disclaimer, the term of this patent is extended or adjusted under 35 U.S.C. 154(b) by 96 days.

(21) Appl. No.: 13/547,607

(22) Filed: Jul. 12, 2012

(65) Prior Publication Data

US 2014/0014487 A1    Jan. 16, 2014

(51) Int. Cl.

| | |
|---|---|
| *H01H 9/26* | (2006.01) |
| *H01H 13/72* | (2006.01) |
| *H01H 13/76* | (2006.01) |
| *B29C 70/78* | (2006.01) |
| *H01H 13/88* | (2006.01) |
| *H01H 13/705* | (2006.01) |

(52) U.S. Cl.
CPC ............... *B29C 70/78* (2013.01); *H01H 13/88* (2013.01); *H01H 13/705* (2013.01); *H01H 2221/044* (2013.01); *H01H 2229/044* (2013.01); *H01H 2233/004* (2013.01)

(58) Field of Classification Search
CPC ........ H01H 13/70; H01H 13/83; H01H 13/88
USPC ....................................................... 200/5 A
See application file for complete search history.

(56) References Cited

U.S. PATENT DOCUMENTS

| | | | | |
|---|---|---|---|---|
| 6,023,033 | A * | 2/2000 | Yagi ..................... | H01H 13/705 200/341 |
| 6,774,330 | B2 * | 8/2004 | Blossfeld et al. ............ | 200/512 |
| 8,411,038 | B2 * | 4/2013 | Adams et al. ................ | 345/168 |
| 8,616,026 | B2 * | 12/2013 | Yoon et al. ................... | 68/12.27 |
| 2009/0301852 | A1 * | 12/2009 | Keist et al. ................... | 200/341 |
| 2011/0162945 | A1 * | 7/2011 | Chen ............................. | 200/314 |
| 2011/0216008 | A1 * | 9/2011 | Adams .............. | H01H 11/0056 345/168 |

* cited by examiner

*Primary Examiner* — Renee S Luebke
*Assistant Examiner* — Lheiren Mae A Caroc
(74) *Attorney, Agent, or Firm* — Finnegan, Henderson, Farabow, Garrett & Dunner, LLP

(57) ABSTRACT

A button matrix is disclosed. The button matrix includes a base portion. A button body extends from the base and is formed from a translucent material. A button top formed from an opaque material is connected to the button body.

18 Claims, 3 Drawing Sheets

BUTTON MATRIX AND METHOD OF MOLDING THEREOF

BACKGROUND OF THE INVENTION

1. Field of the Invention

The present patent document relates generally to molded buttons for electronic devices and more specifically to a co-molded button matrix and method of molding a button matrix.

2. Background of the Related Art

Button matrixes found in prior art electronic devices often included silkscreened colors on the button tops. After extended use, the silkscreened colors would wear off, detracting from the appearance of the device. Moreover, a DJ's night vision may also be impaired if two much illumination is permitted to shine through the buttons.

Accordingly, there is a need in the industry for an illuminated button matrix that includes button tops that resist wear from repeated use.

SUMMARY OF THE INVENTION

The button matrix described herein solves the problems of the prior art by providing a button matrix that includes a co-molded opaque button tops. The base portion is preferably molded from a translucent synthetic or real rubber material that permits the button matrix to be illuminated. The opaque button tops prevent the transmission of light, providing a pleasing aesthetic look that also does not interfere with the night vision of the DJ.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
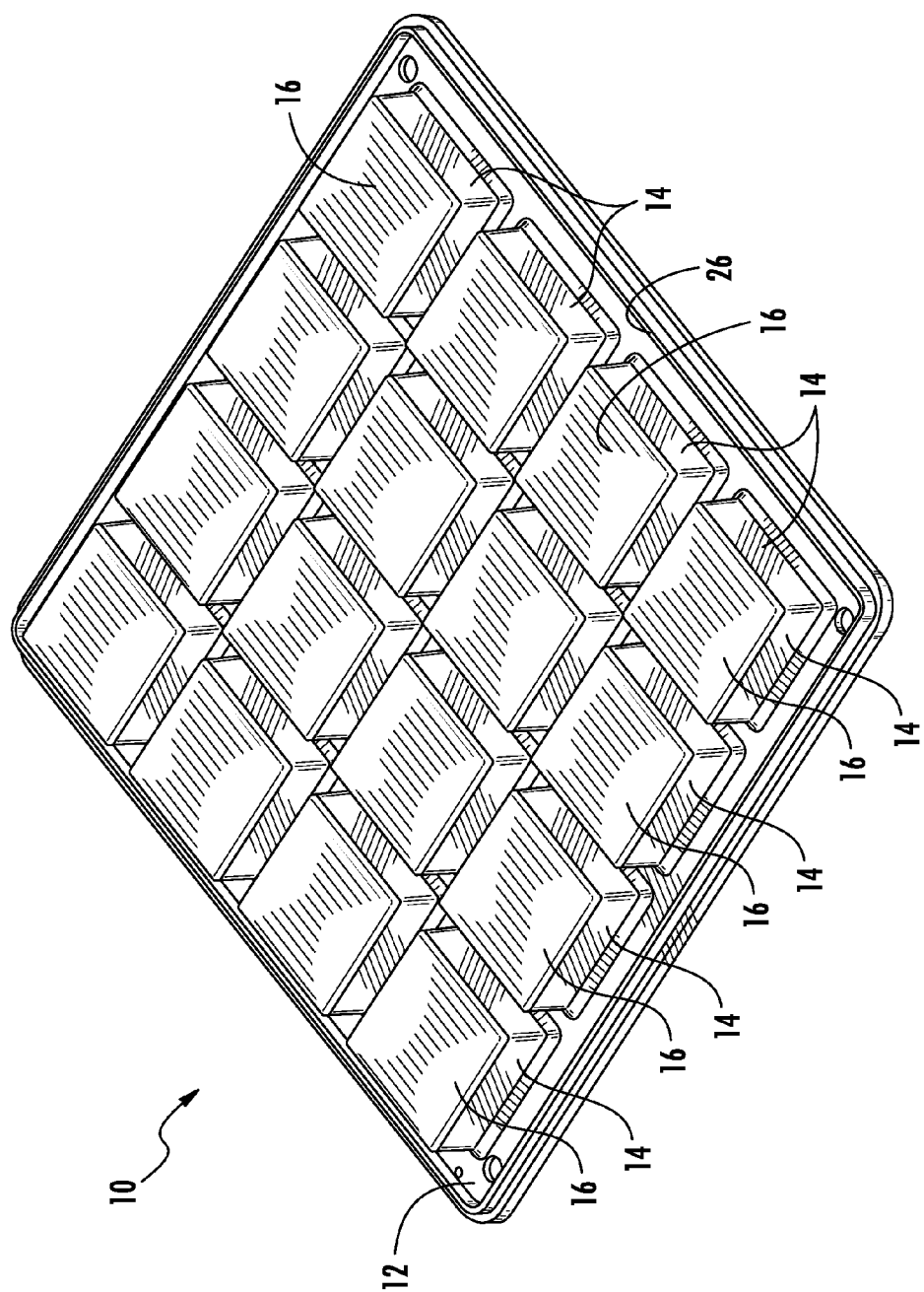
FIG. 1 is a top perspective view of a button matrix.
Figure 2:
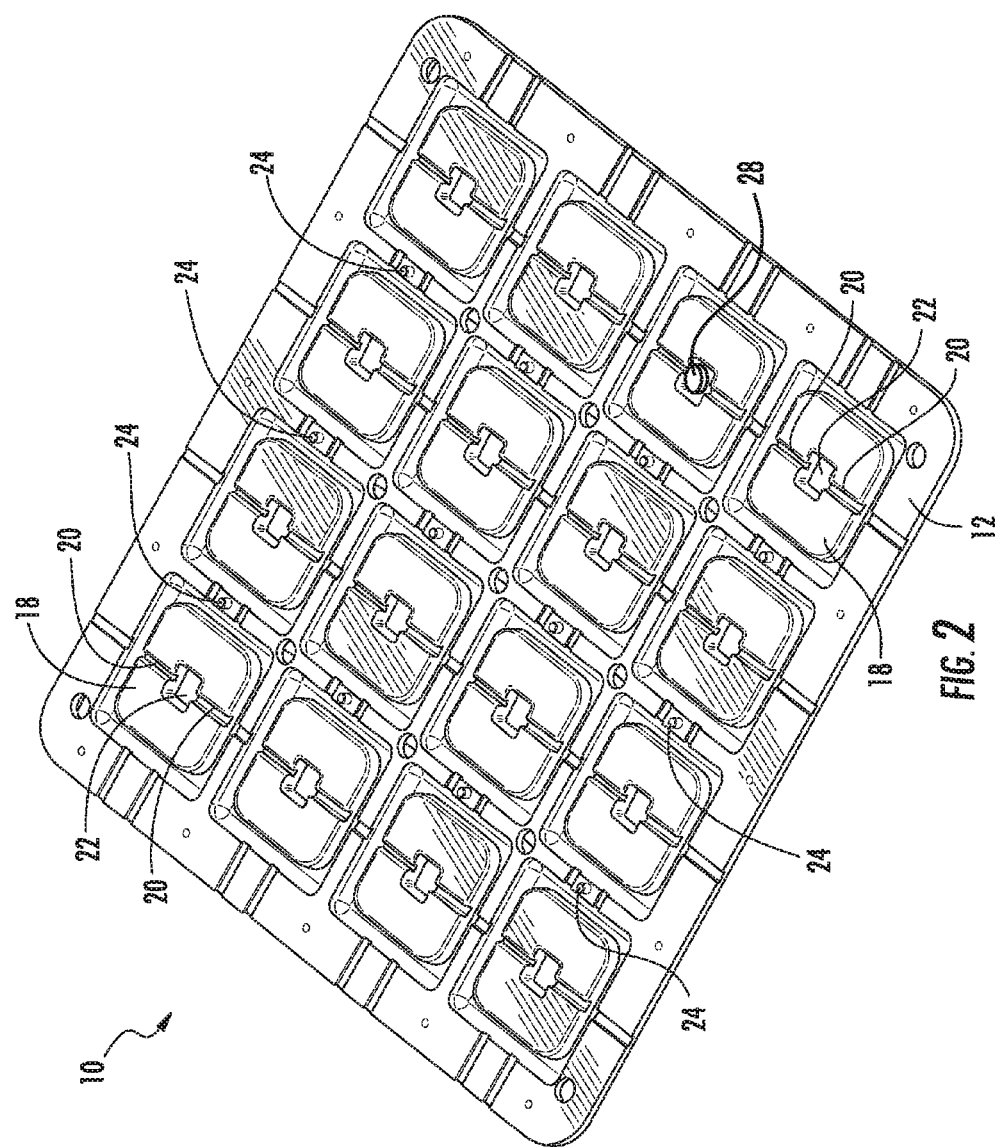
FIG. 2 is a bottom perspective view of a button matrix.
Figure 3:
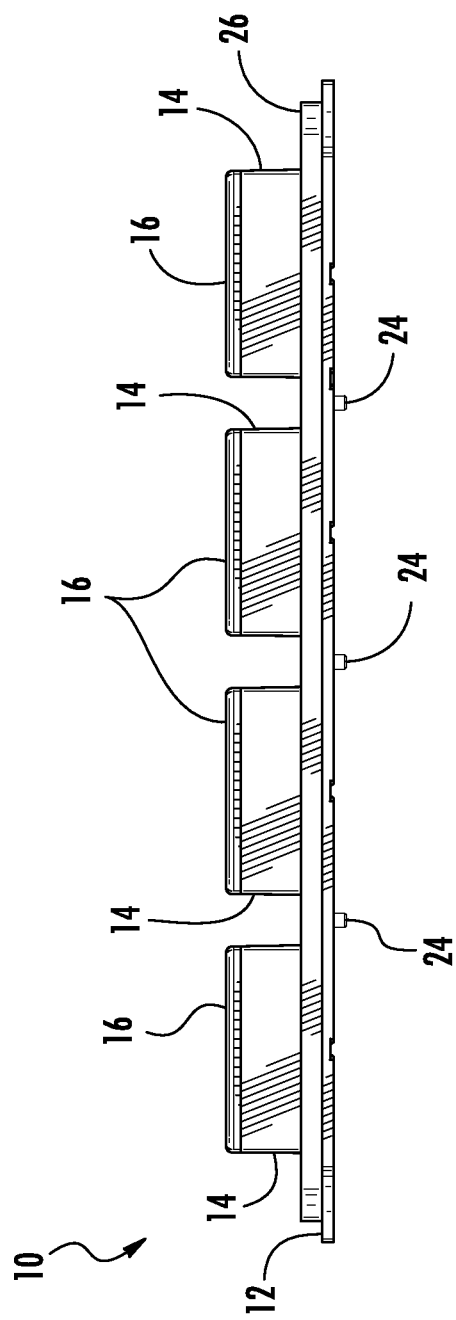
FIG. 3 is a front elevation view of a button matrix.

Referring to FIGS. 1-3, a button matrix is shown generally at 10. The button matrix 10 includes a base portion 12 with a number of button bodies 14 extending therefrom. The base portion 12 and button bodies 14 are formed from a translucent material to permit light to transmit therethrough. A number of button tops 16 are connected to the button bodies 14. The button tops 16 are formed from an opaque material. The button matrix 10 is preferably molded from a flexible synthetic rubber or rubber material.

As shown, the button matrix 10 includes sixteen button bodies 14 with sixteen respective button tops 16, arranged in a four by four grid on the base portion 12. However, the number of button bodies 14 and corresponding button tops 16 may be varied as is known in the art.

Each button body 14 has a bottom portion with a doomed surface 18. The domed surface 18 is designed to contact a switch, such a force sensing resistor or membrane switch placed beneath it in the electronic device the button matrix 10 is housed within. The domed surface 18 may include relief 20 formed thereon to permit the domed surface 18 and button body 14 to flex easily downward when pressed by and user and provide a spring-like tension to return the button body 14 upwards to an un-pressed state.

The domed surface 18 may further include a recess 22 to permit a light, such as an LED 28, to be placed inside the button body 14. Because the button body 14 is molded from a translucent material, the light will illuminate the button body 14 in darkened rooms, making the button body 14 easy to locate by a DJ during a performance. The recess 22 may be centered in the domed surface 18 to ensure the illumination of the light is transmitted equally through the button body 14.

The base portion 12 may further include a bottom surface that has a plurality of locating pins 24 depending therefrom. The locating pins permit the button matrix 10 to be easily located on the electronic device during assembly.

The base portion 12 may also include peripheral lip 26 extending upwards therefrom, which also aides in preventing the button matrix 10 from moving within the electronic device, as the peripheral lip 26 may be captured in place within the housing of the electronic device.

The button matrix 10 is formed by molding a base portion 12 with a button body 14 extending therefrom. A button top 16 is also molded. The button top 16 and button body 14 are connected together. Preferably the base 12 with button bodies 14 and the button tops 16 are bonded together during the molding process, ensuring that the button tops 16 do not separate from the button bodies 14 in the future. Preferably a co-molding process is used.

During the molding process, it is preferred that the base portion 12 and button bodies 14 are molded from a translucent material and that the button tops 16 are molded from an opaque material.

Therefore, it can be seen that the present invention provides a unique solution to the problem of providing a button matrix that includes durable button tops that are not prone to wear as prior art silkscreened button tops are prone to do.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A button matrix, comprising:
    a base portion;
    a button body extending from the base portion formed from a translucent material, wherein a bottom of the button body has a domed surface, wherein the domed surface includes a relief configured to provide a spring-like tension to return the button body upwards to an un-pressed state when the button body is pressed by a user; and
    a button top formed from an opaque material connected to the button body, wherein the button top is configured to permit light to transmit through at least one side wall of the button body.

2. The button matrix of claim 1, further comprising a plurality of button bodies extending from the base portion having a plurality of button tops connected thereto.

3. The button matrix of claim 1, further comprising sixteen button bodies having sixteen respective button tops, the sixteen button bodies arranged in a four by four grid on the base portion.

4. The button matrix of claim 1, wherein the domed surface of the button body includes a recess.

5. The button matrix of claim 4, wherein the recess is centered in the domed surface.

6. The button matrix of claim 5, wherein an LED is placed in the recess.

7. The button matrix of claim 1, wherein the base portion includes a bottom surface having a plurality of locating pins depending therefrom.

8. The button matrix of claim 1, wherein the base portion includes a peripheral lip extending upwards therefrom.

9. The button matrix of claim 1, wherein the button top is co-molded to the button body.

10. A button matrix, comprising:

a base portion;

a button body extending from the base portion formed from a translucent material, wherein a bottom of the button body has a domed surface, wherein the domed surface comprises a recess and an LED is placed in the recess; and a button top formed from an opaque material connected to the button body, wherein the button top is configured to permit light to transmit through at least one side wall of the button body.

11. The button matrix of claim 10, further comprising a plurality of button bodies extending from the base portion having a plurality of button tops connected thereto.

12. The button matrix of claim 10, further comprising sixteen button bodies having sixteen respective button tops, the sixteen button bodies arranged in a four by four grid on the base portion.

13. The button matrix of claim 10, wherein the recess is centered in the domed surface.

14. The button matrix of claim 10, wherein the domed surface includes a relief.

15. The button matrix of claim 14, wherein the relief is configured to provide a spring-like tension to return the button body upwards to an un-pressed state when the button body is pressed by a user.

16. The button matrix of claim 10, wherein the base portion includes a bottom surface having a plurality of locating pins depending therefrom.

17. The button matrix of claim 10, wherein the base portion includes a peripheral lip extending upwards therefrom.

18. The button matrix of claim 10, wherein the button top is co-molded to the button body.

\* \* \* \* \*